United States Patent [19]

Chaney et al.

[11] 4,060,159
[45] Nov. 29, 1977

[54] HOIST COOLING SYSTEM

[75] Inventors: Lynn Harold Chaney, Forrest City, Ark.; Glenn S. Smith, Abqaiq, Saudi Arabia

[73] Assignee: Eaton Corporation, Cleveland, Ohio

[21] Appl. No.: 683,602

[22] Filed: May 5, 1976

[51] Int. Cl.² .................. F16D 13/72; F16D 13/74
[52] U.S. Cl. .................... 192/113 B; 188/264 E
[58] Field of Search .................. 192/113 B, 15; 188/264 E, 264 P

[56] References Cited

U.S. PATENT DOCUMENTS

| 2,202,137 | 5/1940 | Brown | 192/113 B X |
| 2,501,096 | 3/1950 | Robins et al. | 192/15 |
| 3,452,848 | 7/1969 | Brunner | 192/113 B |
| 3,493,087 | 2/1970 | Freeman et al. | 192/16 |
| 3,614,999 | 10/1971 | Sommer | 192/113 B |
| 3,638,773 | 2/1972 | Lewis et al. | 192/113 B X |
| 3,756,359 | 9/1973 | Suez et al. | 192/16 |
| 3,924,715 | 12/1975 | Cory | 192/113 B X |

Primary Examiner—William L. Freeh
Assistant Examiner—R. E. Gluck
Attorney, Agent, or Firm—Teagno & Toddy

[57] ABSTRACT

A hoist cooling system in which a motor-driven pump forces oil under pressure through the hoist load brake and overload clutch. An end cover of the hoist gear case is employed as a heat exchange member, and includes fins to further enhance cooling. Oil is conducted through the load brake and overload clutch by means of interconnecting bores formed in the countershaft supporting the clutch and brake and in the brake and clutch operating disks.

12 Claims, 3 Drawing Figures

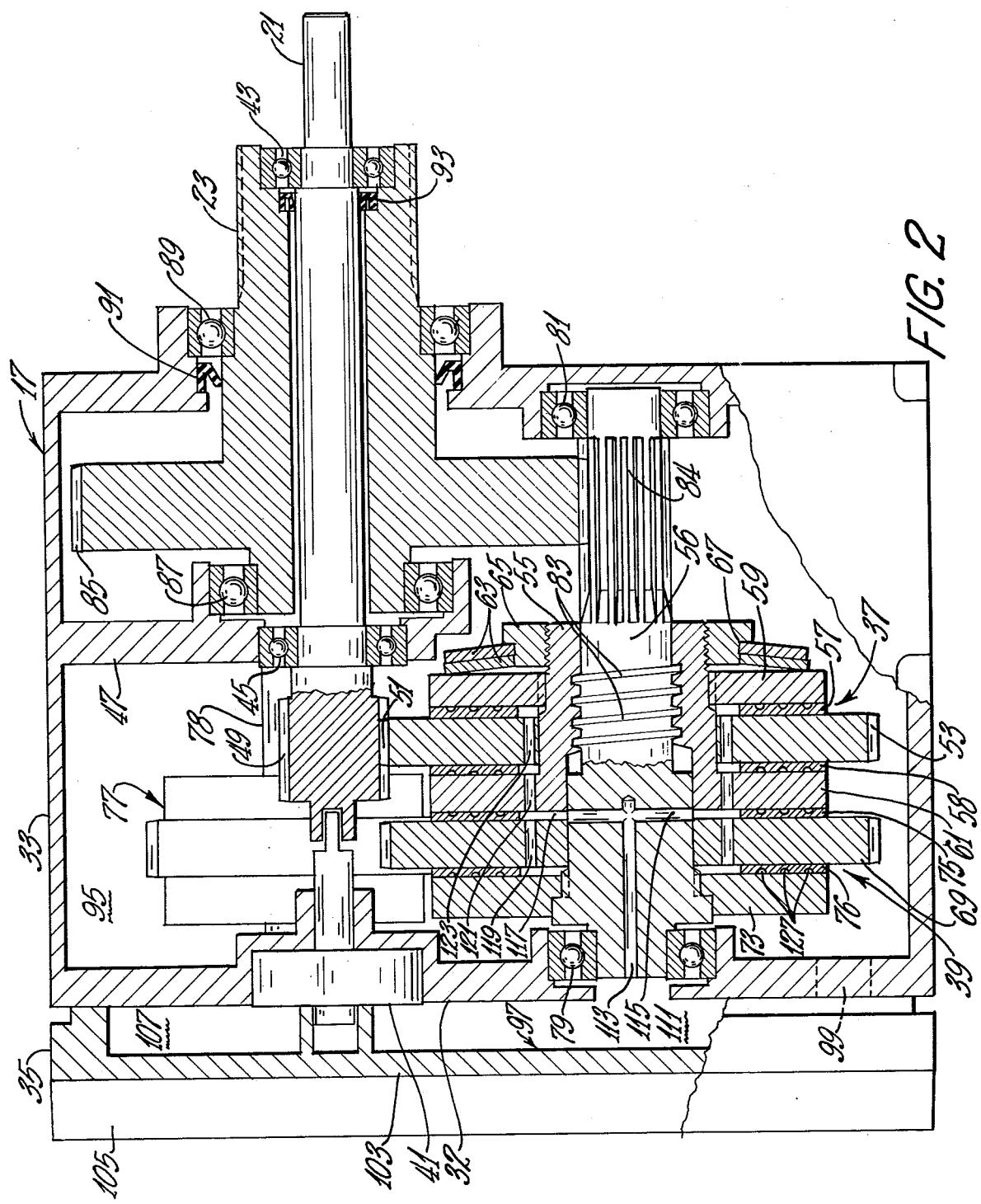

HOIST COOLING SYSTEM

This invention relates generally to powered hoists, and more specifically to a cooling system for a hoist equipped with a load brake.

According to current industry practice hoists are evaluated on the basis of their work rating. Briefly, the work rating involves the life expectancy of gears, bearings, and related components; the mean effective load handled by the hoist; and the allowable ratio of running time to idle time. In hoists equipped with a mechanical load brake, the ratio of running time to idle time, referred to as the operational time rating, is limited by the energy which can be dissipated through the brake and gear case to the surrounding environment.

It is known that heat dissipation in a load brake-equipped hoist can be improved by means of a pressure lubrication system, providing coolant flow through the load brake. U.S. Pat. No. 2,202,137 discloses such a system in general; however, the patented system is disclosed in conjunction with a very large hoist wherein the space taken up by the cooling system components was not a serious design consideration. Heretofore, it has not been considered practical to incorporate such a system in the modern type of compact hoist with a capacity range in the area of from 1/2 to 20 tons. Accordingly, what has become standard industry practice is to "de rate" a given hoist in order to meet an operational time rating requirement. That is, a hoist of a higher rated load capacity than that actually required for lifting the load will often have to be supplied in order to meet an operational time rating requirement.

What the present invention is intended to accomplish is to provide an effective cooling system for a compact, enclosed powered hoist which, for any given hoist capacity, will significantly improve the operational time rating of that hoist.

Accordingly, it is an object of this invention to provide improved cooling in a hoist equipped with a mechanical load brake.

Another object of the invention is to provide a hoist cooling system of the forced oil flow type wherein components of the hoist, including the mechanical load brake, are cooled by oil circulating under pressure.

Another object of the invention is to provide a forced cooling system for a hoist, including improved heat exchange means for dissipating heat generated by the load brake.

To meet the above objectives, the present invention provides a hoist in which the drive components between the prime mover and the output drum or sheave are enclosed within a sealed housing or gear case and a pump is provided to circulate oil under pressure from a sump formed in the housing, through a heat exchange area within the housing, and then to the load brake and back to sump. The heat exchange area is formed in galleries between the end wall of the housing and a cover attached to the housing. The cover has fins formed thereon for maximum dissipation of heat to the surrounding environment by convective and radiative heat transfer.

Other objects and advantages of the invention will become apparent from the following specification when taken in connection with the following drawings, wherein:

FIG. 2 is a plan view of the gear case of the invention, shown partly in section.

Figure 1:
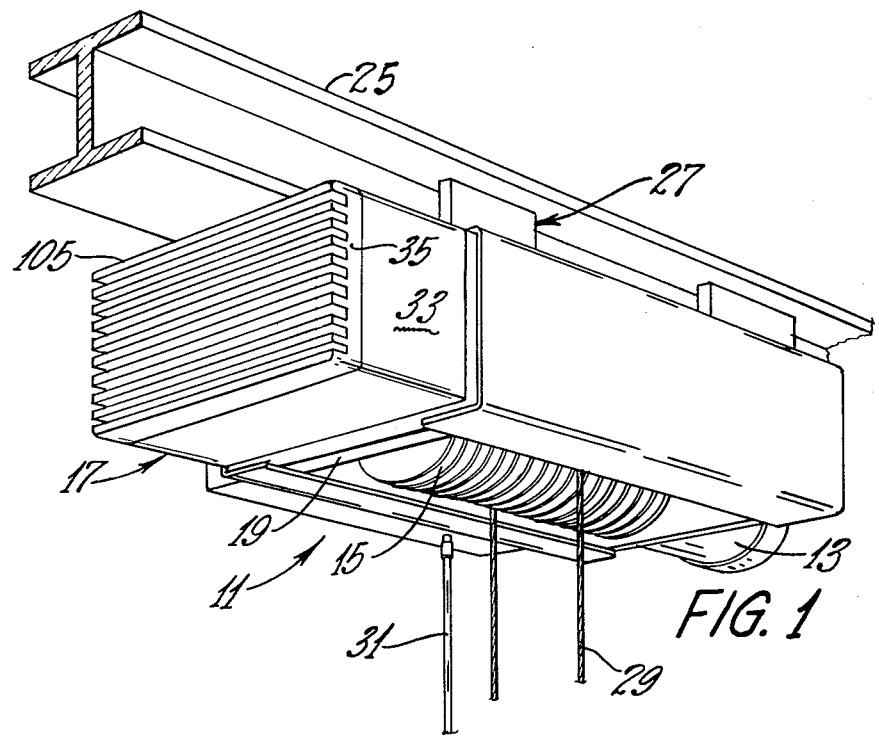
FIG. 1 is a perspective view of a hoist incorporating the invention.

Referring to the drawings, in FIG. 1 there is illustrated an electric cable hoist, designated generally by the numeral 11, comprising a motor 13, a cable drum 15, and a gear case 17, mounted on a suitable frame 19. The gear case 17 contains all the drive components of the hoist, such as reduction gearing, load brake, overload clutch and the like, in a self-contained, sealed unit connected to the other hoist components by an elongated input shaft 21 (see FIG. 2) operatively connected to the output of the motor 13 by a long shaft (not shown) running through the cable drum 15, and an output shaft 23 surrounding the input shaft and operatively connected to the drum 15. The hoist 11 is adapted to be suspended from an I-beam rail 25 by a trolley assembly, designated generally by the numeral 27. A load (not shown) to be handled by the hoist is supported by a cable 29, and the hoist is controlled by an operator by means of a pendant control unit (not shown) suspended from an electrical cable 31, in a conventional manner.

Figure 3:
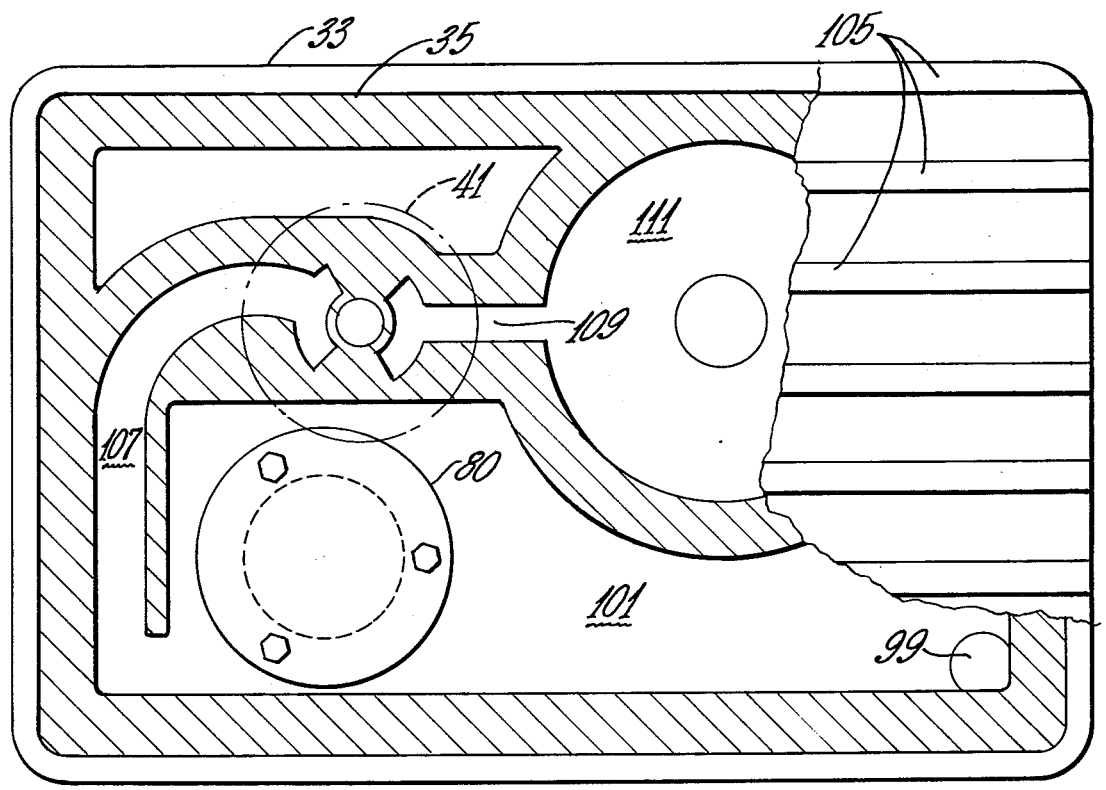
FIG. 3 is an end elevation view of the gear case, shown partly in section.

Referring particularly to FIGS. 2 and 3, the gear case 17 comprises a main housing 33, a cover 35 bolted or otherwise attached to the main housing, an overload clutch 37 driven by the input shaft 21, a load brake 39, and an oil pump 41.

The input shaft 21 extends through the output shaft 23 and is supported at its outer end by a bearing 43 received in the output shaft. The inner end of the input shaft 21 is supported by a bearing 45 received in an internal wall 47 in the main housing 33. An input pinion gear 49 is formed on the inner end of the input shaft 21 and engages gear teeth 51 formed on the input member 53 of the overload clutch 37.

The overload clutch comprises the input member 53, rotatably received on an actuating or input member 55 of the load brake 39, which in turn is supported by a countershaft 56; friction disks 57, 58 bonded to the opposed faces of the input member 53; a pressure plate 59 splined to the actuating member 55 and in engagement with friction disk 57; a flange 61 formed on the actuating member 55 and in engagement with the friction disk 58; spring washers 63 in engagement with the pressure plate 59; and a nut 65 on which the washers are loosely received, and which is threaded onto the actuating member 55. A shoulder 67 on the nut engages the outer spring washer so that when the nut is threaded onto the actuating member the input member 53 is clamped between the pressure plate 59 and the flange 61 through the friction disks 57, 58. The spring washers 63 can be adjusted to allow the input member 53 to slip relative to the flange 61 and pressure plate 59 at a predetermined overload torque.

At torque loads under the overload level, input torque is transmitted from the input gear 49 through the input member 53 to the flange 61 of the actuating member 55. The actuating member 55 thus acts as the input member to the load brake 39.

The load brake 39 comprises the actuating member 55; a ratchet disk 69 rotatably received on the countershaft 56; a friction flange 73 splined or keyed to the countershaft; friction disks 75, 76 bonded to the ratchet disk, and a one-way backstop device, designated generally by the numeral 77. The countershaft 56 is supported by bearings 79 and 81 received in the opposed end walls of the main housing 33 and has threads 83 formed thereon in engagement with corresponding internal threads formed in the actuating member 55. Thus, the load brake 39 defines a well-known Weston brake in which the actuating member 55 moves axially along the countershaft 56 by virtue of the threaded connection to clamp the ratchet disk 69 between the flange 61 and the friction flange 73 to either drive the countershaft in a load raising direction or lock it up against the backstop in a load lowering direction. In the illustrative embodiment the backstop device is a one-way sprag clutch geared to the ratchet disk, and serves as the load pawl in the classic Weston brake package.

The Weston brake per se forms no part of this invention, and is quite well-known in the art. Accordingly, it will not be described in further detail herein. Examples of overload clutch and load brake combinations similar to that shown in FIG. 2 can be formed in U.S. Pat. Nos. 2,501,096 and 3,756,359.

The countershaft 56 has gear teeth 84 found on one end in meshing engagement with an output gear 85 formed on output shaft 23. Output shaft 23 is supported by a bearing 87 received in the wall 47 and a bearing 89 received in the inner end wall of the main housing 33. Seals 91 and 93 acting on the output and input shafts respectively, seal off the interior of the gear case.

The cooling system of the present invention comprises the pump 41; the cover 35, which serves as a heat exchange unit; an oil sump or reservoir 95, formed in the bottom of the main housing 33; and a plurality of passages formed in the cover 35 and in the housing 33 to conduct oil from the sump, through the pump to the overload clutch and load brake, and back to sump, while passing the oil over a heat exchange surface 97 formed on the cover 35.

The pump 41 is mounted in outer end wall 32 of the housing 33 and is driven directly by the input shaft 21. A simple slot and key coupling is shown; however, any convenient form of shaft coupling may be used. The pump, shown in outline only, is a commercially available unit and will not be described in detail. A pump which has been used successfully is a gerotor pump, type 4065, manufactured by the W. H. Nichols Company, which includes reversible porting so that it operates the same in either direction of shaft rotation.

Referring to FIGS. 2 and 3, oil flows from the sump area 95 through a passage 99 formed in the outer end wall 32 and into a cavity 101 formed in the cover 35. Within cavity 101 the oil flows across heat exchange surface 97 on the inside of end wall 103 of the cover 35, wherein heat is conducted to the cover. The cover 35 is a relatively heavy casting, and to further improve heat dissipation from the hoist, a plurality of fins 105 are cast on the outside surface of the end wall 103. Thus, heat conducted to the end wall 103 is dissipated to the atmosphere by convection and radiation.

After the oil passes through the cavity 101, it is drawn through pump inlet gallery 107, formed in the cover 35, by the pump 41 and is discharged under pressure through pump outlet gallery 109 into a clutch/brake inlet gallery 111. The cooled oil then flows through a central axial bore 113 in the countershaft 56, through a radial cross bore 115 to the load brake 39 in a cavity 117 between the ratchet disk 69 and the actuating member 55, and within the inside diameter of the friction disk 75. Cooling oil then flows through axial bores 119, 121 and 123 formed in the ratchet disk 69, the flange 61 of actuating member 55, and the clutch input member 53, respectively. The friction disks 57, 58, 75, 76 may have grooves 127 formed therein, as disclosed in U.S. Pat. No. 3,493,087, to facilitate the flow of cooling oil across the engaging surfaces of the disks.

After the oil flows past the friction surfaces of the overload clutch and load brake, it is allowed to return by gravity to the sump 95 formed in the main housing to complete the coolant flow cycle.

The sprag clutch 77 is mounted on a shaft 78 supported by the walls 32 and 47. In the illustrative embodiment, the shaft includes an integral flange portion 80 (FIG. 3) which is bolted to the wall 32. The clutch 77 is mounted low in the housing 33 and is lubricated by the oil in the sump 95.

It can be appreciated that in contrast to prior art cooling systems, the present invention provides improved means for dissipating the heat generated at the friction surfaces of the hoist overload clutch and load brake, thus significantly increasing the amount of power which can be absorbed by a given size clutch, brake, or clutch/brake package, while extending the useful life of the components.

We claim:

1. In a hoist, a housing, an energy absorbing device mounted in said housing, a prime mover mounted in said housing and operatively connected to said energy absorbing device, a pump mounted in said housing and operatively connected to said prime mover, an oil sump formed in said housing, oil passage means formed in said energy absorbing device for distributing oil thereto, and a cover attached to a wall of said housing, said cover having a heat exchange surface formed thereon and including an oil inlet gallery in communication with said sump and with the inlet of said pump, and an oil outlet gallery in communication with the outlet of said pump and with said oil passage means.

2. Apparatus as claimed in claim 1 in which said housing includes a substantially closed end wall and said cover includes an end wall spaced from the end wall of said housing to define said galleries between said walls, at least a portion of said oil inlet gallery being defined by the end wall of said cover, whereby said cover wall defines said heat exchange surface.

3. Apparatus as claimed in claim 2, including one or more cooling fins formed on the outside of the end wall of said cover.

4. Apparatus as claimed in claim 1, including a shaft mounted for rotation within said housing, and means mounting at least a portion of said energy absorbing device on said shaft, said shaft including an axial bore extending at least part way through said shaft, a radial bore extending through said shaft and intersecting said axial bore, said portion of said energy absorbing device being located on said shaft in position relative to said radial bore to provide an oil flow path through said bores and past at least one heat absorbing surface of said device.

5. Apparatus as claimed in claim 4 in which said shaft is supported for rotation in a bore through the end wall of said housing, said axial bore being open to said oil outlet gallery formed in said cover.

6. Apparatus as claimed in claim 4 in which said energy absorbing device comprises an interconnected overload clutch and load brake mounted in surrounding relation to said shaft.

7. Apparatus as claimed in claim 6 in which said energy absorbing device comprises a clutch input disk member, a first pair of friction disks in contact with the opposed faces of said clutch input disk member, a brake input disk having a first face in contact with one of said first pair of friction disks, a ratchet disk, and a second pair of friction disks in contact with the opposed faces of said ratchet disks, one of said second pair of friction disks also being in contact with a second face of said brake input disk.

8. Apparatus as claimed in claim 7 in which the inside diameter of the friction disk in contact with said ratchet disk and said brake input disk is substantially larger than the outside diameter of said shaft to form a cavity defined by said inside diameter, said outside diameter, and the adjacent faces of said ratchet disk and said brake input disk, said cavity being aligned with the radial bore of said shaft to provide an oil path into said cavity.

9. Apparatus as claimed in claim 8, including one or more axial holes extending through said ratchet disk, and one or more axial holes extending through said brake input disk, each of said holes opening to said cavity.

10. Apparatus as claimed in claim 9, in which each of said friction disks has a plurality of grooves formed in at least one face thereof, said grooves being arranged to provide a plurality of flow paths extending across each disk.

11. Apparatus as claimed in claim 10, in which said hoist includes a one-way backstop device having an input member in operational engagement with said ratchet disk, said backstop member being disposed within said housing in a position wherein it is at least partially submerged in oil within said sump.

12. Apparatus as claimed in claim 9, including at least one axial bore extending through said clutch input disk, the center of said bore in said clutch input disk being located on a radius smaller than the inside radius of the friction disk in contact with the clutch input disk and the brake input disk.

* * * * *

UNITED STATES PATENT AND TRADEMARK OFFICE
CERTIFICATE OF CORRECTION

PATENT NO. : 4,060,159
DATED : November 29, 1977
INVENTOR(S) : Lynn Harold Chaney; Glenn S. Smith It is certified that error appears in the above-identified patent and that said Letters Patent are hereby corrected as shown below:

Col. 3, line 17, "formed" should read -- found --.
Col. 3, line 19: "found" should read "formed".

Signed and Sealed this

Fourteenth Day of March 1978

[SEAL]

Attest:

RUTH C. MASON
Attesting Officer

LUTRELLE F. PARKER
Acting Commissioner of Patents and Trademarks